United States Patent
Lauterbach et al.

(10) Patent No.: US 6,172,886 B1
(45) Date of Patent: Jan. 9, 2001

(54) APPARATUS FOR VOLTAGE MULTIPLICATION WITH OUTPUT VOLTAGE HAVING LOW DEPENDENCE ON SUPPLY VOLTAGE

(75) Inventors: Christl Lauterbach, Höhenkirchen-Siegertsbrunn; Martin Bloch, Gröbenzell, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/214,575
(22) PCT Filed: Jun. 12, 1997
(86) PCT No.: PCT/DE97/01197
 § 371 Date: Jan. 7, 1999
 § 102(e) Date: Jan. 7, 1999
(87) PCT Pub. No.: WO98/01938
 PCT Pub. Date: Jan. 15, 1998

(30) Foreign Application Priority Data

Jul. 5, 1996 (DE) .............................. 196 27 197

(51) Int. Cl.[7] .............................. H02M 3/18; H03K 3/01
(52) U.S. Cl. .............................. 363/60; 327/536
(58) Field of Search .............................. 363/59, 60; 327/535, 327/536, 537

(56) References Cited

U.S. PATENT DOCUMENTS

| | | | |
|---|---|---|---|
| 5,513,091 | * | 4/1996 | Uchida et al. .............................. 363/60 |
| 5,801,987 | * | 9/1998 | Dinh .............................. 365/185.18 |
| 5,856,918 | * | 1/1999 | Soneda et al. .............................. 363/60 |

FOREIGN PATENT DOCUMENTS

| | | |
|---|---|---|
| 0 135 889 | 4/1985 | (EP) . |
| 0 350 462 | 1/1990 | (EP) . |
| 0 678 970 A2 | 10/1995 | (EP) . |

OTHER PUBLICATIONS

A 5–V–Only Operation 0.6 um Flash EEPROM with Row Decoder Scheme in Triple–Well Structure, Umezawa et al., pp. 1540–1546, Mar. 1992.

* cited by examiner

*Primary Examiner*—Matthew Nguyen
(74) *Attorney, Agent, or Firm*—Schiff Hardin & Waite

(57) ABSTRACT

An apparatus for voltage multiplication of the kind required, for example, for programming flash EEPROMs. The apparatus has the advantage that comparatively simple and good regulation of the output voltage can be produced even in integrated circuits in which severe fluctuations in the supply voltage may be allowed.

5 Claims, 2 Drawing Sheets

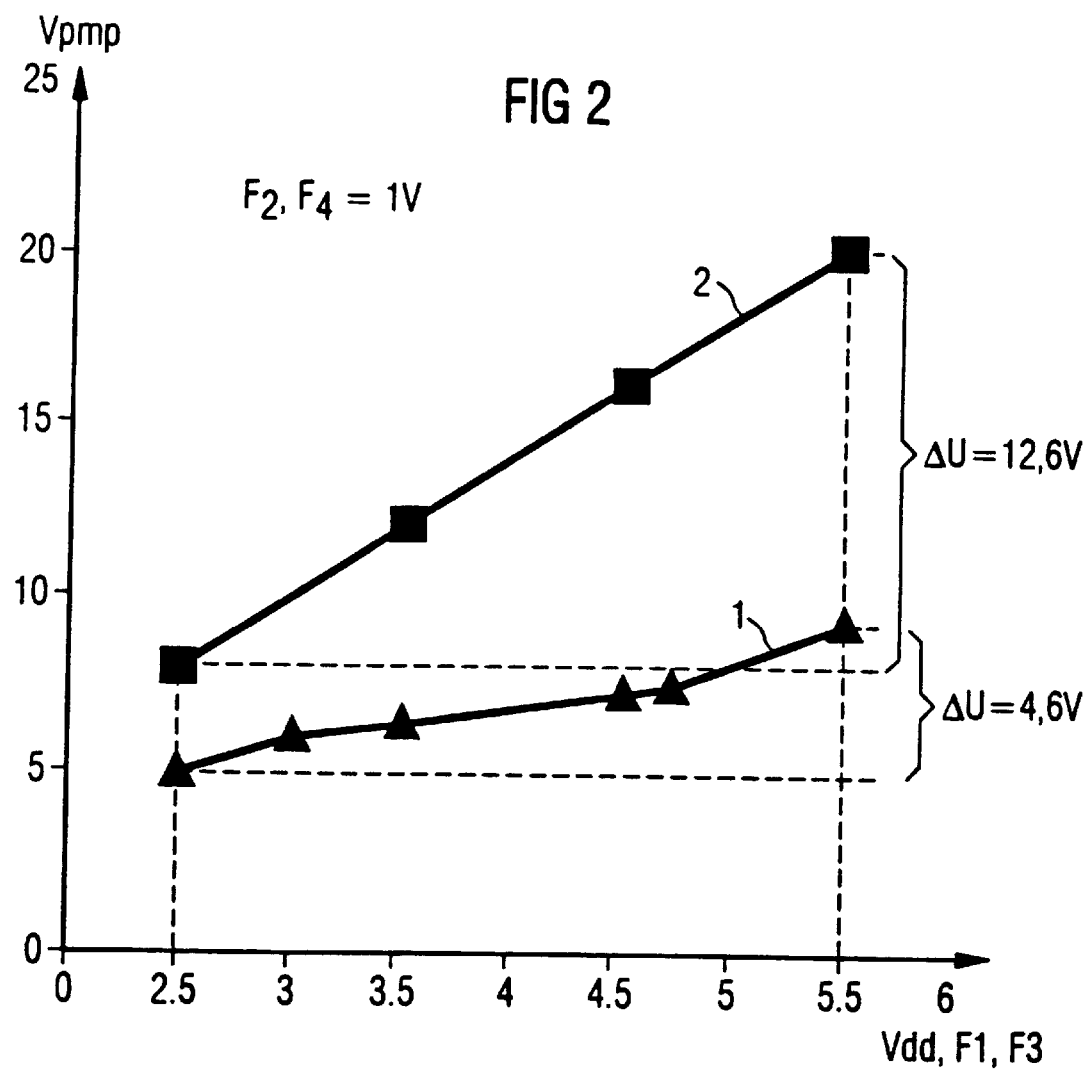

APPARATUS FOR VOLTAGE MULTIPLICATION WITH OUTPUT VOLTAGE HAVING LOW DEPENDENCE ON SUPPLY VOLTAGE

BACKGROUND OF THE INVENTION

1. Field of the Invention

The present invention relates to an apparatus for voltage multiplication wherein the output voltage has a relatively low dependence on the supply voltage, such that comparatively simple and good regulation of the output voltage can be produced even in integrated circuits.

2. Description of the Prior Art

In order to program non-volatile memories, such as flash EEPROMs, a "high voltage" up to approximately 30 V generated by so-called voltage pumps is typically used. These voltage pumps operate on the principle of capacitive voltage multiplication and have one MOS diode and one capacitor per pump stage. Regulated voltage pumps which ensure a large constant internal rated voltage are employed in integrated circuits in which major fluctuations in the supply voltage may be allowed. These charge or voltage pumps must be designed in such a way that, even with small supply voltages such as 2.5 volts the internally required rated voltage, of 5 volts for example, is still reached. The result of this, however, is that at high supply voltages of approximately 5 or 6 volts, comparatively very high voltages of 20 or 30 volts are reached in a relatively short time, which leads to considerable regulation problems.

The publication by A. Umezawa et al., "A 5-V Only Operation 0.6 μm Flash EEPROM with Row Decoder Scheme in Triple-Well Structure", IEEE Journal of Solid State Circuits, Vol. 27, No. 11 (1992), discloses an apparatus for voltage multiplication with high-voltage PMOS transistors and additional boost transistors. However, this apparatus is not suitable for integrated circuits in which severe fluctuations in the supply voltage may be allowed.

The European Application Document 0 350 462 discloses regulation of the output voltage of a voltage multiplier in which the clock signals originate from a ring oscillator whose frequency depends on the output voltage.

The European Application Document 0 135 889 discloses a circuit for voltage multiplication in which the substrates of the p-channel transistors are permanently connected to the supply voltage and the substrates of the n-channel transistors are permanently connected to the reference-earth potential.

A object of the present invention, therefor, is to specify an apparatus for voltage multiplication which has a low dependence of the output voltage on the pump voltage or supply voltage and which is suitable for the widest possible supply voltage range.

SUMMARY OF THE INVENTION

In an embodiment of the present invention an apparatus for voltage multiplication is provided, which includes: at least two pump transistors connected as a series circuit with connections therebetween defined as transistor connection nodes, a first pump transistor connected directly to an input voltage of the apparatus and a second pump transistor connected to an output voltage of the apparatus; a first clock signal to which gates of odd-numbered pump transistors are connected via first capacitors; a second clock signal to which gates of even-numbered pump transistors are connected via further first capacitors; a third clock signal to which odd-numbered connection nodes of the series circuit are connected via second capacitors; a fourth clock signal to which even-numbered connection nodes of the series circuit are connected via further second capacitors; a regulator connected to the voltage output of the apparatus wherein the regulator switches on and off the first through fourth clock signals; and a voltage divider which feeds a partial voltage of the output voltage to all substrate terminals of the at least two pump transistors.

In an embodiment, the apparatus further includes at least two boost transistors, wherein the gate of a respective pump transistor is connected via a respective boost transistor to the respective connection node to the preceding pump transistor, and wherein the gate of the respective boost transistor is connected to the respective connection node to the next pump transistor, and wherein all substrate terminals of the boost transistors and of the pump transistors are supplied with the partial voltage from the voltage divider.

In an embodiment, the voltage divider is formed by a series circuit of a p-channel MOS transistor and a current-limiting element, in such series circuit the partial voltage is present at a connection node between the p-channel MOS transistor and the current-limiting element which is connected to reference-earth potential, a terminal of the first MOS transistor other than the connection node being connected to the output voltage of the apparatus, and the gate terminal of the p-channel MOS transistor being connected to the supply voltage of the apparatus.

In an embodiment, the apparatus further includes two additional MOS transistors connected as diodes to form the current-limiting element.

In an embodiment, the regulator device has a proportional/derivative regulator.

Additional features and advantages of the present invention are described in, and will be apparent from, the Detailed Description of the Preferred Embodiments and the Drawings.

DESCRIPTION OF THE DRAWINGS

FIG. 2 shows a diagram for illustrating the output voltage as a function of the pump voltage in the cases of a known voltage multiplier apparatus as well as the apparatus according to the present invention.

DETAILED DESCRIPTION OF THE PREFERRED EMBODIMENTS

Figure 1:
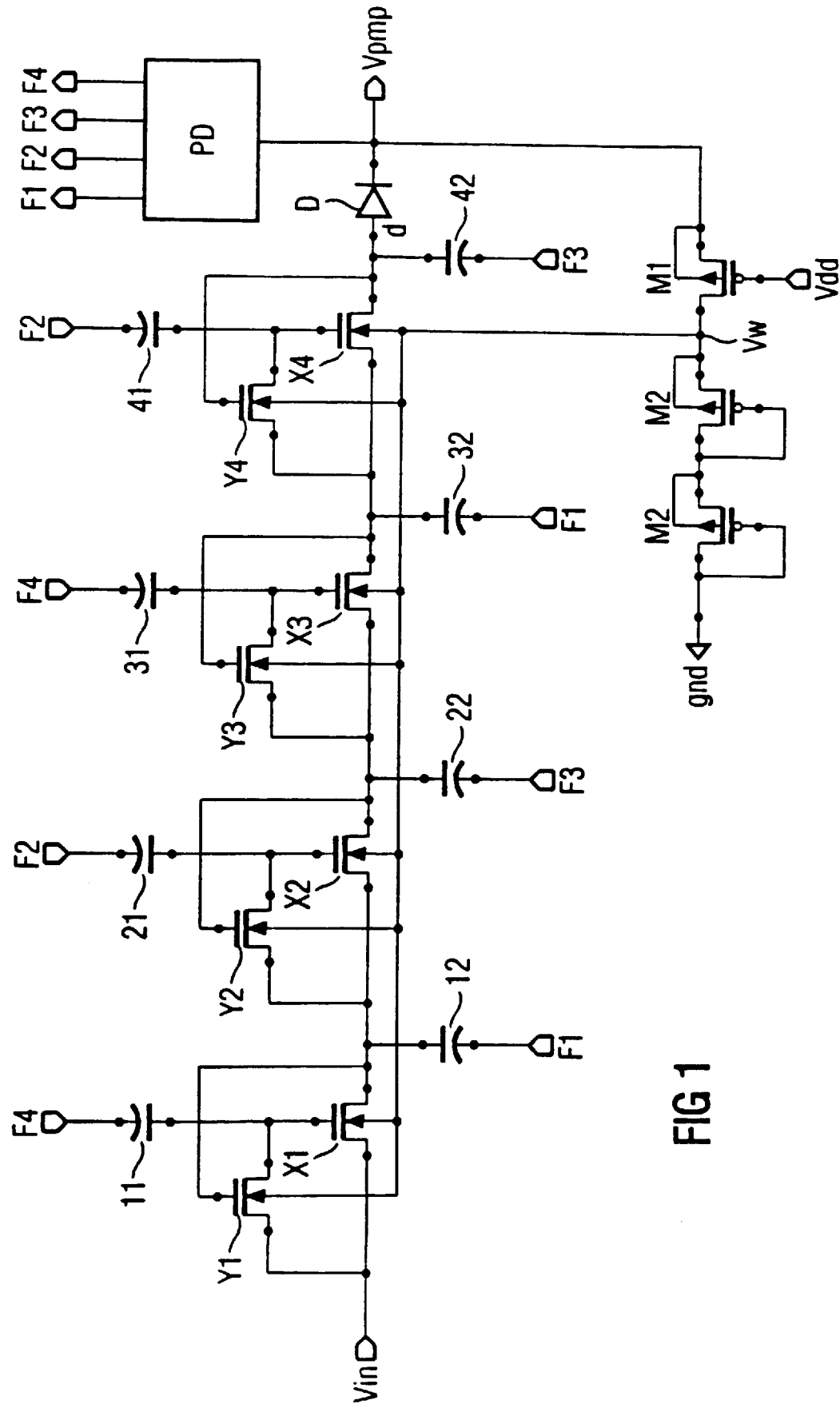
FIG. 1 shows a circuit diagram of an apparatus according to the present invention.

A four-stage apparatus according to the present invention for generating an output voltage Vpmp is illustrated by way of example in FIG. 1. Shown are a first stage having an MOS transistor X1 and an NMOS transistor Y1 as well as a capacitor 11 and a capacitor 12, a second stage having NMOS transistors X2, Y2 as well as capacitors 21, 22, a third stage having NMOS transistors X3, Y3 as well as capacitors 31, 32 and a fourth stage having NMOS transistors X4, Y4 as well as capacitors 41 and 42. An input voltage $V_{in}$ of the apparatus according to the present invention is fed to a terminal of the transistor X1, this terminal being connected to the gate terminal of the transistor Y1 and constituting the input of the first stage. The gate of the transistor X1 is connected to a terminal of the transistor Y1 and, via the capacitor 11, to a clock input F1. An output of the first stage is connected to a second terminal of the transistor Y1 and to a second terminal of the transistor X1 and also, via the capacitor 12, to a clock signal F3. An input of the second stage is connected to the output of the first stage and the output of the second stage is connected to the input of the third stage. The design of the second stage corresponds to the design of the first stage, but the capacitor 21, unlike the capacitor 11, is not connected to the clock signal F4 but to the clock signal input F2, and the capacitor 22, unlike the capacitor 12, is not connected to the clock signal input F1 but to the clock signal F3. The stages 3 and 4 correspond to the first two stages in terms of their design and in terms of their supply with the clock signal, and are connected downstream of the second stage. A forward-biased diode D is provided at the output of the fourth stage at the cathode terminal of which diode the output voltage Vpmp is present.

Although the boost transistors Y1 . . . Y4 increase the efficiency of the voltage pump, they are not absolutely necessary for practicing the present invention.

The pump clock signals V1 and F3 and the boost clock signals F2 and F4 are generated, for example, by an oscillator and a downstream trigger logic arrangement, from the supply voltage Vdd which may, in this case, fluctuate between 2.5 V and 5.5 V. The clock signal voltages F1 . . . F4 in this case fluctuate in the same range as the supply voltage. With the aid of a regulator unit, for example a proportional/derivative regulator unit PD, [lacuna] the apparatus formed in such a way that, given a corresponding input voltage $V_{in}$, the desired output voltage Vpmp is established even without special connection of the substrate terminals, provided that a regulator which is suitable for the voltages is present.

A simple P regulator, or a more efficient but more complicated PID regulator, also can be used as the regulator unit.

Furthermore, the apparatus according to the present invention contains a regulated voltage divider which has p-channel transistors M1, M2 and M3, wherein these transistors M1 . . . M3 are connected in series and the two transistors M2 and M3 are connected as current limiting diodes. current-limiting elements, such as one or more resistors, are also conceivable instead of the current-limiting diodes. A first terminal of the transistor M1 is connected to the output voltage Vpmp, and a second terminal of the transistor M1, whose gate is connected to Vdd, is connected to a first terminal of the transistor M2, the connection node supplying a well voltage $V_w$ which is fed to all the substrate terminals of the transistors X1 . . . X4 and Y1 . . . Y4. A second terminal and a gate terminal of the transistor M2 are connected to a substrate terminal and to a first terminal of the transistor M3. A second terminal and a gate terminal of the transistor M3 are connected to reference-earth potential ground.

In the present invention, the existing substrate control effect of high-voltage CMOS transistors is deliberately used to make voltage pumps more efficient at low supply voltages Vdd and to impair them at high supply voltages Vdd, wherein regulation is made significantly simpler. The regulation is simpler because, as shown in FIG. 2, the voltage change of Vpmp to be regulated, given a voltage change of Vdd from, in this case, 2.5 V to 5.5 V, is reduced from 12.6 V to only 4.5 V.

For this purpose, it is necessary to reduce the boost amplitudes in the boosted charge pump to approximately 1 volt, in order for the substrate control effect to take place. The voltage divider of the transistors M1 . . . M3 produces, by means of the decoupling of the supply voltage Vdd via the gate of the transistor M1, a low well bias voltage Vw at the substrate terminals of the transistors X1 . . . X4 and, if appropriate, Y1 . . . Y4 at a high supply voltage Vdd, which corresponds to a low substrate control factor.

At a supply voltage Vdd of 2.5 volts, for example, the well bias voltage Vw is approximately 4.3 volts and, starting from a supply voltage value of approximately 4.7 volts, reaches a value of an approximately constant 0.7 volts. At supply voltages Vdd or less than or equal to 3.1 volts, a leakage current flows in each case through the forward-biased diode between the source and p-type well of the transistors X1 . . . X4 and, if appropriate, Y1 . . . Y4, thereby reducing the well bias voltage Vw. Sensitivity of the pump voltage to the output voltage of 0.9 volts/1 volt, compared with 4.4 volts/1 volt for an arrangement without the voltage divider composed of the transistors M1 . . . M3, is obtained for the linearly regulated range of the voltage divider composed of the transistors M1 . . . M3, that is to say for supply voltages between 3.1 volts and 4.7 volts. This lower dependence of the pump output voltage on the supply voltage Vdd leads to considerable simplification of the regulation.

FIG. 2 illustrates a diagram in which the output voltage Vpmp is plotted against the amplitude of the boost/pump pulses F1 . . . F4 for the apparatus according to the present invention as a graph 1 and for a corresponding apparatus without the voltage divider composed of the transistors M1 . . . M3 as a graph 2. The pump voltage amplitude of the pulses F1 and F3 in this case corresponds to the supply voltage Vdd and the diagram shown in FIG. 2 consequently also qualitatively reflects the lower dependence of the pump voltage Vpmp on the supply voltage Vdd in the case of the apparatus according to the present invention. The boost pulses preferably have an amplitude of 1 V.

Although the present invention has been described with reference to specific embodiments, those of skill in the art will recognize that changes may be made thereto without departing from the spirit and scope of the invention as set forth in the hereafter appended claims.

What is claimed is:

1. An apparatus for voltage multiplication, comprising:

at least two pump transistors connected as a series circuit with connections therebetween defined as transistor connection nodes, a first pump transistor connected directed to an input voltage of the apparatus and a second pump transistor connected to an output voltage of the apparatus;

a first clock signal to which gates of odd-numbered pump transistors are connected via first capacitors;

a second clock signal to which gates of even-numbered pump transistors are connected via further first capacitors;

a third clock signal to which odd-numbered connection nodes of the series circuit are connected via second capacitors;

a fourth clock signal to which even-numbered connection nodes of the series circuit are connected via further second capacitors;

a regulator connected to the voltage output of the apparatus wherein the regulator switches on and off the first through fourth clock signals; and a voltage divider which feeds a partial voltage of the output voltage to all substrate terminals of the at least two pump transistors.

2. An apparatus for voltage multiplication as claimed in claim 1, further comprising:

at least two boost transistors, wherein the gate of a respective pump transistor is connected via a respective boost transistor to the respective connection node to the preceding pump transistor, and wherein the gate of the respective boost transistor is connected to the respective connection node to the next pump transistor or to the input voltage of the apparatus, and wherein all substrate terminals of the boost transistors and of the pump transistors are supplied with the partial voltage provided by the voltage divider.

3. An apparatus for voltage multiplication as claimed in claim 1, wherein the voltage divider is formed by a voltage divider series circuit of a p-channel MOS transistor and a current-limiting element, in which voltage divider series circuit the partial voltage is present at a connection node between the p-channel MOS transistor and the current-limiting element which is connected to reference-earth potential, a terminal of the first MOS transistor other than the connection node being connected to the output voltage of the apparatus, and the gate terminal of the p-channel MOS transistor being connected to the supply voltage of the apparatus.

4. An apparatus for voltage multiplication as claimed in claim 3, wherein two further MOS transistors are connected as diodes and form the current-limiting element.

5. An apparatus for voltage multiplication as claimed in claim 2, wherein the regulator device has a proportional/derivative regulator.

* * * * *